United States Patent [19]
Forward, Jr.

[11] 3,732,592
[45] May 15, 1973

[54] CHIP REMOVER
[75] Inventor: Worthy J. Forward, Jr., Rochester, N.Y.
[73] Assignee: USM Corporation, Rochester, N.Y.
[22] Filed: Aug. 2, 1971
[21] Appl. No.: 167,899

[52] U.S. Cl. ............15/246.5, 408/67, 90/58 B, 90/11
[51] Int. Cl. ...........................B23b 41/00
[58] Field of Search...................408/18, 67; 15/246.5, 93 R, 93 A, 93 B; 90/58 B, 11 R

[56] References Cited

UNITED STATES PATENTS 1,917,831  7/1933  Fairbairn.......................408/67
3,526,013  9/1970  Kato..............................15/93 A
3,533,327  10/1970  Hagerty......................408/67 UX

*Primary Examiner*—Leon G. Machlin
*Attorney*—Shlesinger, Fitzsimmons & Shlesinger

[57] ABSTRACT

The table of a vertical boring mill has a trough surrounding it; and a plurality of paddles are mounted on paddle carriers to be driven around said trough to sweep chips before them. The paddle carriers are secured to an endless circularly arranged chain driven by a sprocket; and the bottom of the trough has a slot or slots therein through which the paddles sweep the chips out of the trough.

3 Claims, 2 Drawing Figures

INVENTOR.
WORTHY J. FORWARD, JR.

CHIP REMOVER

The present invention relates to chip removers and more particularly to a chip remover for vertical boring mills.

The removal of chips produced in a cutting operation is always a problem in a machine tool. This is particularly a problem where the work is carried by a revolving table past one or more cutting tools as is the case with a vertical boring mill. The chips are turned off in a spiral and tend to twist themselves around and spin off onto the floor.

The primary object of this invention is to provide means for readily controlling and removing chips from a vertical boring mill as they are cut.

Another object of the invention is to provide apparatus of the character described which will deliver the chips to selected points around the table for removal and disposal.

Other objects of the invention will be apparent hereinafter from the specification and from the recital of the appended claims, particularly when read in conjunction with the accompanying drawings.

Figure 1:
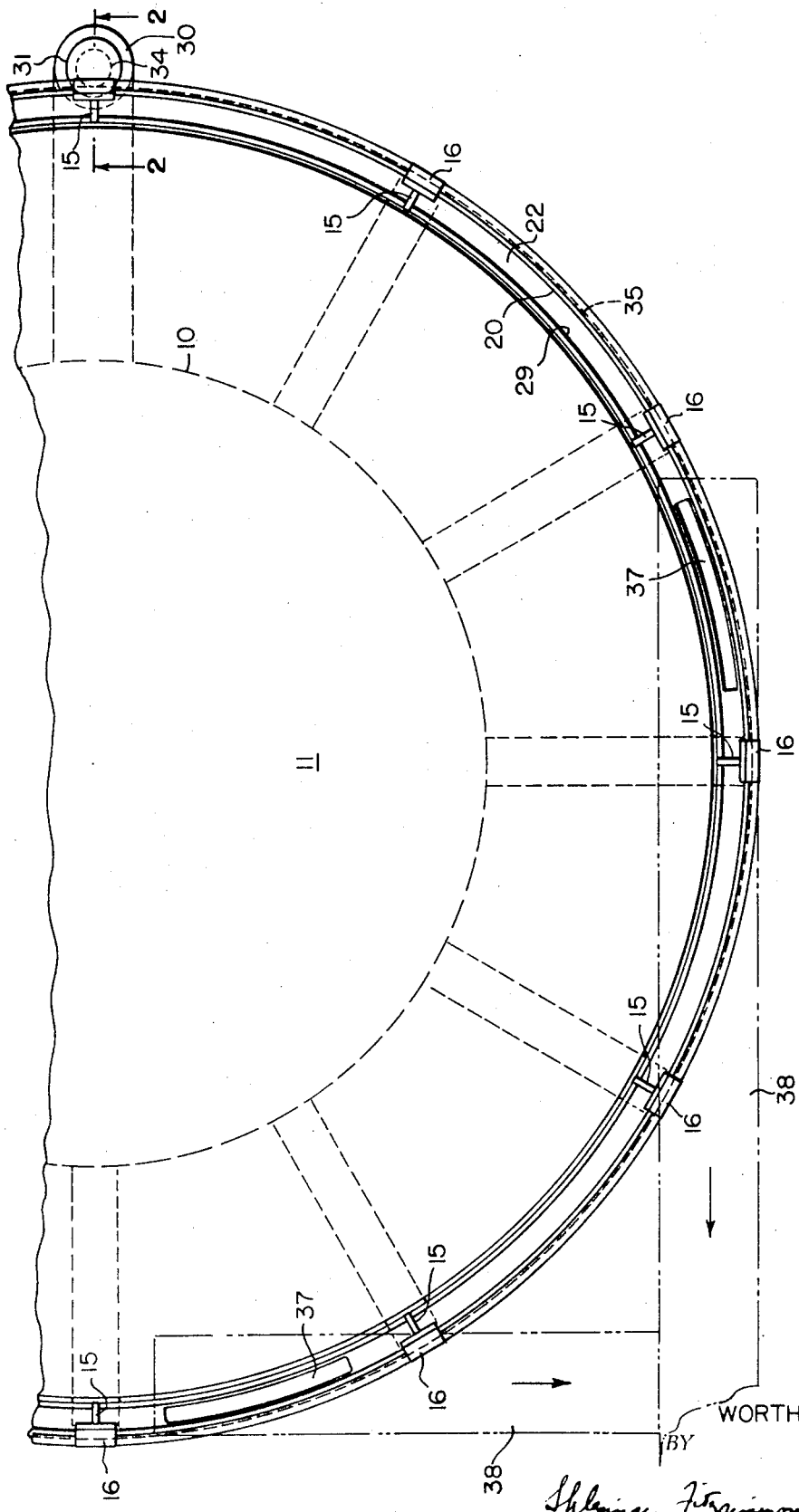
FIG. 1 is a fragmentary plan view.
Figure 2:
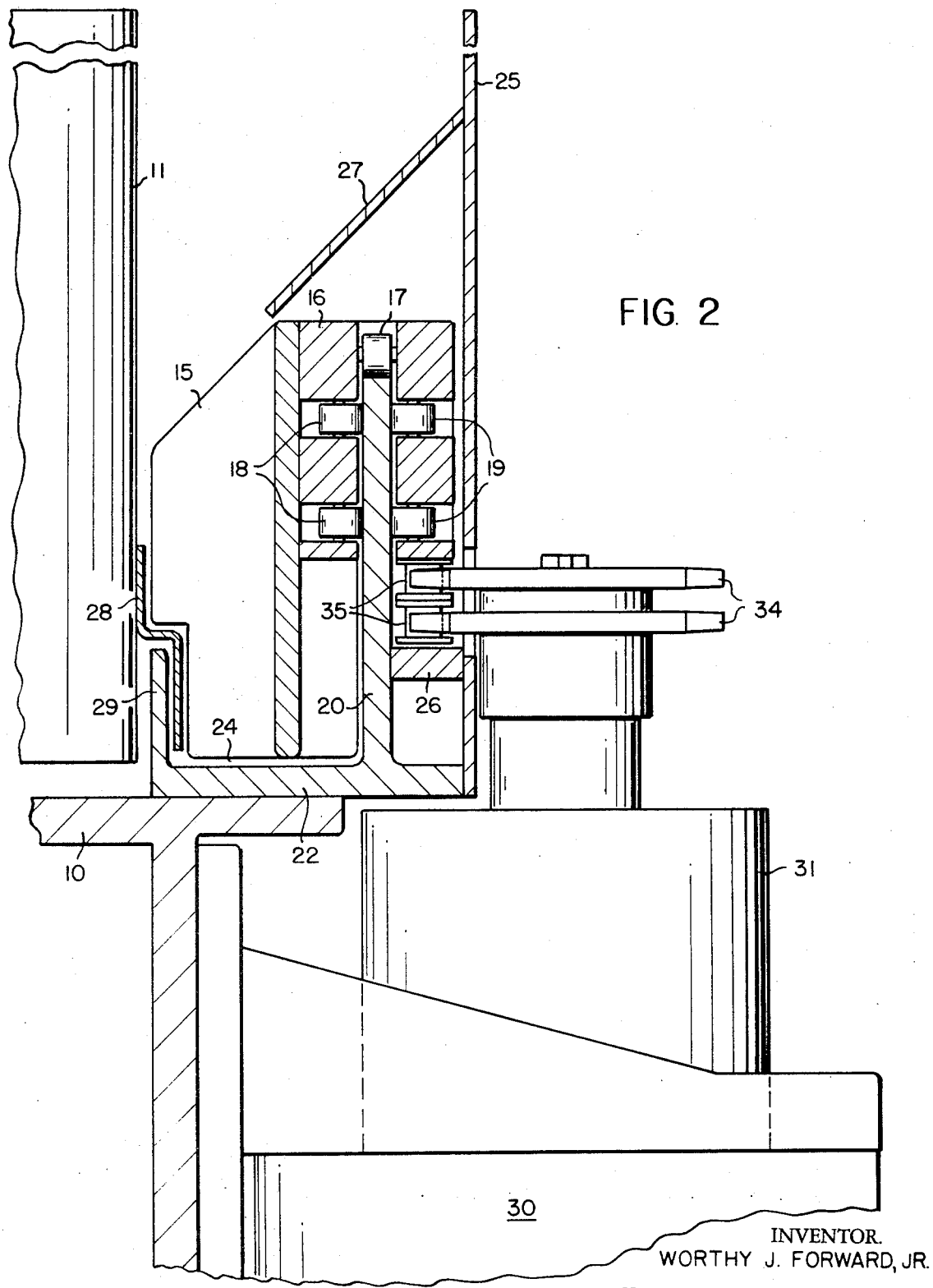
FIG. 2 is a sectional view on the line 2—2 of FIG. 1, illustrating chip removing apparatus built according to one embodiment of this invention for servicing a vertical boring mill.

Referring now to the drawings by numerals of reference, 10 denotes the bed of a boring mill, 11 designates the rotary table of this machine, and 12 denotes the upright on which the boring tool is mounted.

The chip removing apparatus of this invention comprises a plurality of equiangularly spaced paddles 15 which are secured to carriers 16 that are supported by rollers 17, 18 and 19 on a circular guide or track 20 which is integral with a skirt member 22 that surrounds the table 11 at the bottom thereof. The paddles 15 travel in a circular channel or trough 24 in skirt 22; and the rollers 18 roll on the inside of the track 20, while rollers 19 ride on the outside of this track, and rollers 17 ride on the top thereof. The rollers 17, 18 and 19 are journaled on carrier 16.

A chip guard 25 is secured to skirt 22 to surround the table 10 outside rollers 19, and is spaced from track 20 by a ring 26 which is secured to track 20. The chip guard extends vertically above the table to prevent any chips from escaping and falling on the floor. An annular, inclined plate 27 is welded or otherwise secured to the chip guard to extend over the carriers 16 to prevent chips from getting into the roller bearings 17, 18 and 19, and to deflect chips into the channel or trough 24.

A circular skirt 28, which is fastened to the table 11 and which has a portion projecting into the trough 24, prevents chips from getting in between the inner wall 29 of the trough and the table.

The annular paddle carriers 16 are driven by a motor 30 and a conventional speed reducer 31. The shaft 32 of the speed reducer carries a double drive sprocket 34 which engages and drives a double strand link chain 35, whose links are fastened to the paddle carriers 16, so that the paddles traverse the trough 24 in a circular path around table 11. An arcuate slot or arcuate slots 37 may be provided in the bottom of the trough 24 so that as the paddles travel around the trough, driven by chain 35, they will sweep the chips, that have fallen into the trough, out of these exit slots whence they may fall onto a conveyor 38 to be carried away from the machine for disposal.

It will be seen then that as the chips are cut from the work-piece by the boring tool, they will fall into the trough 24 and be carried around the trough by the paddles 15 and drop through the slot or slots 37 in the bottom of the trough to be carried away.

While the invention has been described in connection with a specific embodiment thereof, it will be understood that it is capable of further modification, and that this application is intended to cover any uses or modifications of the invention that come within the disclosure or the scope of the appended claims.

Having thus described my invention, what I claim is:

1. Chip removing apparatus for a vertical boring mill or the like, which has a bed and a table rotatable on the bed about a vertical axis, comprising
    an annular trough fixed to said bed and surrounding said table and coaxial therewith,
    a paddle carrier movable in said trough in a path coaxial with said table,
    a paddle secured to said carrier to travel in said trough, and
    means for driving said paddle carrier in said path about the axis of said table and independently of the rotation of said table.

2. Apparatus as claimed in claim 1, wherein
    an annular track is mounted fixedly in said trough coaxial with said table, and said paddle carrier is mounted to travel on said track as said carrier is driven.

3. Apparatus as claimed in claim 2, wherein said paddle carrier is mounted on said track by rollers carried by said carrier and disposed to ride on the outside, inside, and top of said track.

* * * * *